(12) United States Patent
Lohtaja et al.

(10) Patent No.: US 8,442,487 B2
(45) Date of Patent: May 14, 2013

(54) DETECTING A FRAUDULENT MOBILE STATION IN A MOBILE COMMUNICATION SYSTEM USING LOCATION INFORMATION OF MOBILE STATION

(75) Inventors: Jarkko Lohtaja, Singapore (SG); Esko Paldan, Lempäälä (FI)

(73) Assignee: Nokia Corporation, Espoo (FI)

( * ) Notice: Subject to any disclaimer, the term of this patent is extended or adjusted under 35 U.S.C. 154(b) by 1218 days.

(21) Appl. No.: 10/168,051

(22) PCT Filed: Dec. 12, 2000

(86) PCT No.: PCT/FI00/01084
§ 371 (c)(1),
(2), (4) Date: Jun. 3, 2003

(87) PCT Pub. No.: WO01/45444
PCT Pub. Date: Jun. 21, 2001

(65) Prior Publication Data
US 2004/0038666 A1    Feb. 26, 2004

(30) Foreign Application Priority Data

Dec. 13, 1999   (FI) .................................. 19992671 U

(51) Int. Cl.
*H04M 1/66* (2006.01)
*H04M 1/68* (2006.01)
*H04M 3/16* (2006.01)
*H04W 4/00* (2009.01)

(52) U.S. Cl.
USPC ...... 455/410; 455/411; 455/435.1; 455/432.1

(58) Field of Classification Search ............... 455/410, 455/411, 435.1, 456.1, 432.1–435.3; 380/258
See application file for complete search history.

(56) References Cited

U.S. PATENT DOCUMENTS

| 5,309,501 | A | * | 5/1994 | Kozik et al. .................. 455/410 |
| 5,535,431 | A |   | 7/1996 | Grube et al. |
| 5,727,057 | A | * | 3/1998 | Emery et al. ............. 379/201.07 |
| 5,953,652 | A | * | 9/1999 | Amin et al. .................. 455/410 |
| 6,181,934 | B1 | * | 1/2001 | Havinis et al. ............. 455/432.3 |
| 6,611,684 | B1 | * | 8/2003 | Franks .......................... 455/433 |

FOREIGN PATENT DOCUMENTS

| EP | 544 449      | 6/1993  |
| JP | 09-307643 A  | 11/1997 |
| WO | WO 96/15643  | 5/1996  |
| WO | WO 96/41488  | 12/1996 |
| WO | WO 98/19489  | 5/1998  |
| WO | WO 98/33340  | 7/1998  |

* cited by examiner

*Primary Examiner* — Wesley Kim
(74) *Attorney, Agent, or Firm* — Harrington & Smith

(57) ABSTRACT

The invention relates to a mobile communication system including mobile stations, a mobile switching center, and a subscriber register containing subscriber data, which includes location information indicating the location of mobile stations. In order to detect the presence of a fraudulent mobile station the system includes a monitor for monitoring the processes which trigger location information changes in the subscriber register, and a detector for detecting and indicating the presence of a fraudulent mobile station if a location information change has been triggered by a process which should not trigger a change of location information in the subscriber register.

16 Claims, 2 Drawing Sheets

Figure 1:
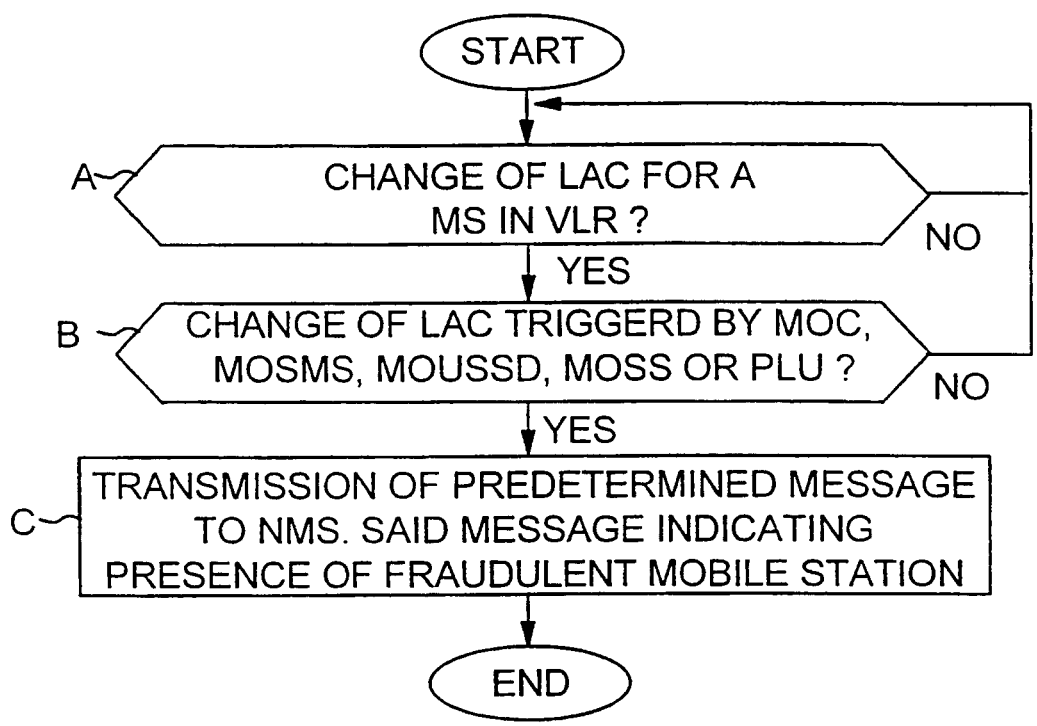

DETECTING A FRAUDULENT MOBILE STATION IN A MOBILE COMMUNICATION SYSTEM USING LOCATION INFORMATION OF MOBILE STATION

This invention relates to the detection of a fraudulent mobile station in a mobile communication system. The term fraudulent mobile station refers in this context to a mobile station which has adopted the identity of another mobile station. Thus, for instance, the charges of services used by the fraudulent mobile station will be charged in the telephone bill of the original mobile station, i.e. the mobile station whose identity the fraudulent mobile station has adopted.

The GSM system (Global System for Mobile communications) is an example of a mobile communication system where the present invention can be used. The identity of a GSM mobile station depends on the information stored in a SIM card (Subscriber Identity Module) which is inserted in the mobile station. SIM cards are manufactured in such a way that it should be impossible to make copies of them. If, however, someone succeeds in producing a duplicate of an existing SIM card, then the duplicate could be used in another mobile station. The fraudulent mobile station containing the duplicate SIM card is then able to register into the mobile communication system with the same mobile identity as the original mobile station, i.e. the mobile station containing the original SIM card. Known GSM systems, for instance, do not have any efficient means for detecting the presence of a fraudulent mobile station. Instead, known GSM networks register the fraudulent mobile station by normal location update procedures.

An object of the present invention is to solve the above mentioned drawback and to provide a method allowing an operator to detect the presence of a fraudulent mobile station as soon as possible. This object is achieved by a method of detecting a fraudulent mobile station in a mobile communication system comprising a mobile switching center and a subscriber register including location information indicating the location of mobile stations. The method of the present invention comprises the steps of: monitoring the processes which trigger location information changes in said subscriber register, and indicating the presence of a fraudulent mobile station if a location information change has been triggered by a process which should not trigger a change of location information in said subscriber register.

Another object of the present invention is to provide a mobile communication system which is able to detect the presence of a fraudulent mobile station. This object is achieved by a mobile communication system comprising: mobile stations, a mobile switching center, and a subscriber register containing subscriber data which includes location information indicating the location of mobile stations. The mobile communication system of the present invention comprises: monitoring means for monitoring the processes which trigger location information changes in said subscriber register, and detecting means for detecting and indicating the presence of a fraudulent mobile station if a location information change has been triggered by a process which should not trigger a change of location information in said subscriber register.

The invention is based on the idea that it is possible to detect the presence of a fraudulent mobile station by monitoring the processes which trigger changes of location information in the subscriber register. A situation where a fraudulent mobile station (with a duplicated SIM card) is used in a mobile communication system at the same time as the original mobile station (with the original SIM card) will lead to location updates which normally should not occur. It is possible to define a list of processes which should not trigger a change of location information. This list can be stored for instance in the memory of the subscriber register together with a computer program that monitors the processes which trigger change of location information. Thus the subscriber register is able to detect abnormal changes of location information, which in this case indicates the presence of a fraudulent mobile station. The invention makes it possible to identify an IMSI (International Mobile Station Identity) which has been duplicated. Thus the operator can remove this IMSI from the HLR register and give a new SIM card with a new IMSI to the subscriber whose SIM card has been duplicated.

The most significant advantages of the present invention are that the presence of a fraudulent mobile station can be identified almost immediately, or in any case before the fraudulent mobile station is able to use the services provided by the network, and that the present invention can be easily applied to existing mobile communication systems by making changes in the computer programs used by the subscriber registers.

In a preferred embodiment the present invention is applied in a subscriber register which is associated with a mobile switching center and which contains data about subscribers located within the coverage area of said mobile switching center. In the GSM system such a register is called a Visitor Location Register VLR. In the GSM system each mobile station arriving to a new location area should immediately perform a location update which will trigger a process where the subscriber data for the mobile station in question is stored in the VLR. This makes it possible to detect the presence of a fraudulent mobile station, if the change of location information is triggered by: a mobile originated call (MOC), a mobile originated short message (MOSMS), mobile originated unstructured supplementary service data (MOUSSD), a mobile originated supplementary service (MOSS), or a periodic location update (PLU). A situation where the location information is changed in connection with a MOC, MOSMS, MOUSSD, MOSS or a PLU should not be possible, as the location information should have been changed already earlier, i.e. at the time when the mobile station in question changed its location (and performed a location update due to the new location), or when the mobile station was turned on (IMSI attach).

The preferred embodiments of the method and mobile communication system of the invention are disclosed in the dependent claims 2-4 and 6-10.

Figure 2:
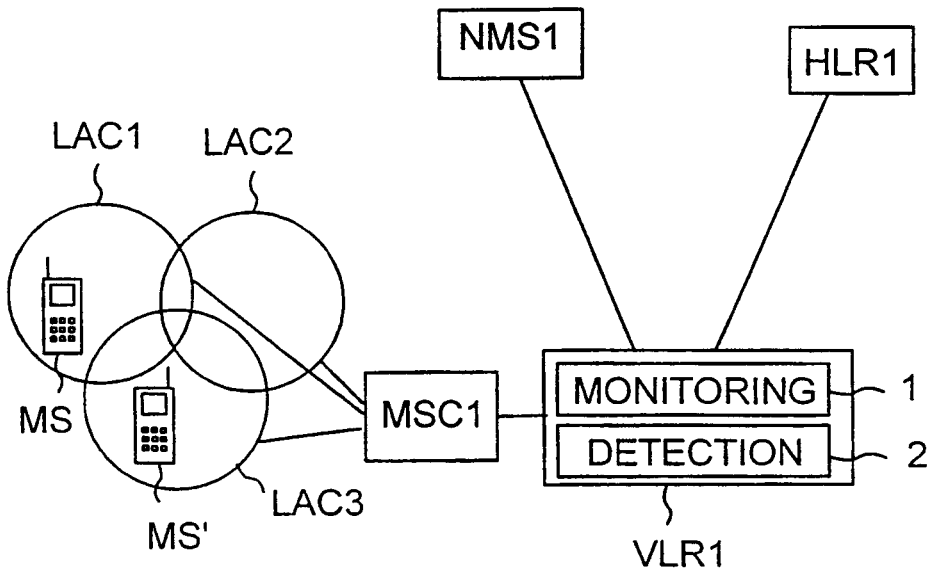
Figure 3:
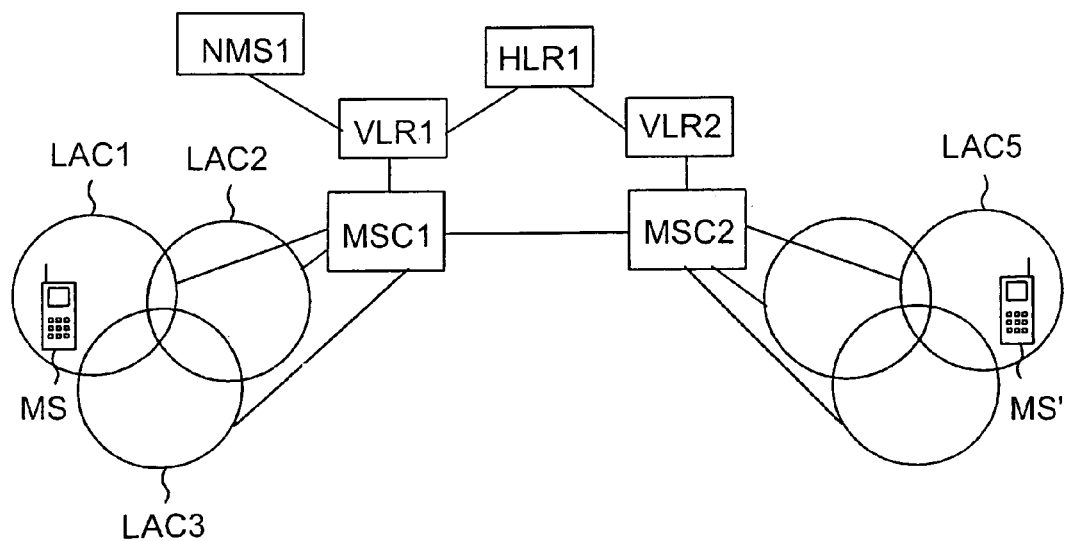

In the following the present invention will be described in closer detail by way of example and with reference to the attached drawings, in which FIG. 1 is a flow diagram of a first preferred embodiment of the method in accordance with the invention, and FIGS. 2 and 3 are block diagrams of a first preferred embodiment of a mobile communication system according to the present invention.

FIG. 1 is a flow diagram of a first preferred embodiment of the method in accordance with the invention. In the following it is assumed by way of example that the solution described in connection with FIG. 1 is used in a GSM system, and, more precisely, in a VLR register of a GSM system.

In block A of FIG. 1 the processes which trigger changes in location information stored in the VLR register are monitored. This can be accomplished, for instance, by adding a computer program for this purpose to the VLR register. If a change of LAC (Location Area Code) for a mobile station MS is detected, then Block B is entered. In this context a change of LAC means that the LAC of a subscriber whose subscriber data is already stored in the VLR is changed or that the subscriber data (including LAC) of a subscriber is stored in the VLR for the first time.

In Block B the reason for the change of LAC is analyzed. If the reason for the change of LAC is a MOC (Mobile Originated Call), a MOSMS (Mobile Originated Short Message), MOUSSD (Mobile Originated Unstructured Supplementary Service Data), a MOSS (Mobile Originated Supplementary Service), or a PLU (Periodic Location Update), then Block C is entered.

The LAC of a specific mobile station should normally change only when the mobile station enters a new location area and transmits a location update request, or when the power of the mobile station is turned on and the mobile station transmits an IMSI attach message. From that moment on, until the mobile station is turned off or the mobile station moves on and enters a new location area, the LAC of the mobile station should remain unchanged in the VLR register.

If a MOC, MOSMS, MOUSSD, MOSS or PLU leads to a change of LAC in the VLR covering the location of the mobile station, then this means either that the mobile station has not been registered in the VLR in question at all, or that the actual location of the mobile station is different from that stored in the VLR. Such a situation can only occur if there has been a malfunction in the VLR (and the VLR has lost all its data, in which case the operator and the VLR register is aware of the problem), or if there exists two mobile stations with identical identities.

In Block C, a predetermined message is generated and transmitted to the NMS (Network Management System). Thus the operator is informed that there exists a fraudulent mobile station in the network. The message preferably includes the information needed for identifying the mobile station in question. In the GSM system, for instance, at least the IMSI (International Mobile Subscriber Identity) is preferably included in the message. This makes it possible for the operator to block the use of any mobile station using the same IMSI as included in the message.

The NMS should be aware of any malfunctions in the system. Thus it is possible for the operator to ensure, prior to blocking said mobile station, that no loss of data has recently occurred in the VLR which detected the presence of a fraudulent mobile station.

FIGS. 2 and 3 are block diagrams of a first preferred embodiment of a mobile communication system according to the present invention. The mobile communication system of FIGS. 2 and 3 is, by way of example, assumed to be a GSM system. FIG. 2 shows a situation where the fraudulent mobile station MS' is located within the coverage area of the same mobile switching center as the original mobile station MS, and FIG. 3 shows a situation where the fraudulent mobile station MS' and the original mobile station MS are located in the coverage area of two different mobile switching centers.

FIG. 2 shows a part of a GSM network of a first operator. The geographical area of the network is divided into location areas. Three different location areas are shown in FIG. 2. Each location area is given a location area code LAC1 to LAC3, and each location area is covered by one or several base stations (not shown in the Figures). The base stations are arranged to regularly broadcast the location area code of the location area to which they belong. Thus for instance the mobile station MS is able to identify the location area code of the base station which is located closest to it.

FIG. 2 shows one mobile switching center MSC1 which covers location areas LAC1 to LAC3. Thus all mobile stations located within these location areas communicate through the mobile switching center MSC1. A Visitor location register VLR1 is arranged in connection with the MSC1. The VLR1 comprises means for storing subscriber data of all subscribers currently located within the coverage area of the MSC1, in other words within the location areas LAC1 to LAC3.

In the following it is assumed that the identity of the mobile station MS has been duplicated by a fraudulent mobile station MS'. Both mobile stations MS and MS' have performed a normal location update when they arrived to the coverage area of the mobile switching center MSC1. Thus the subscriber data of the mobile station MS has been retrieved from the Home Location Register HLR1 of the subscriber and stored into the VLR1. The subscriber data of the MS stored in the VLR1 also includes a location area code.

If the original mobile station MS has entered first in the coverage area of the MSC1 and the fraudulent mobile station MS' has arrived later, then the location update of the fraudulent mobile station has occurred later, and the database of the VLR1 includes a location area LAC3 for the mobile station MS. If the user of the original mobile station at this moment attempts to make a call, in other words a MOC, then the VLR1 receives information about this call attempt. The information received by the VLR1 also includes information about the location area from where the call is originated. Thus the VLR1 discovers that the call attempt originates from LAC1 while the database of the VLR1 indicates that the location area of the MS should be LAC3 (the location of the fraudulent mobile station). When the VLR1 discovers that the information in the database is wrong, it makes a change in the data and stores LAC1 (to its database) as the location area of MS.

According to the invention the VLR1 includes monitoring means 1, which may consist of one or several computer programs. When the monitoring means 1 discover a change of LAC in the VLR1, they activate a process for finding out the reason for the change of LAC. The result of this process is that the detection means 2, which may also consist of one or several computer programs, detect that the reason for the change of LAC is a MOC. The detection means are programmed to know that a MOC should not trigger a change of LAC, and thus they generate and transmit a predetermined message (including the IMSI of the mobile station MS) to the Network Management System NMS1. The operator of the system is thereby informed that the presence of a fraudulent mobile station has been detected.

The monitoring and detecting means can be arranged somewhere else in the system than in the VLR register, as shown in FIGS. 2 and 3. An alternative would be to arrange the monitoring and detecting means for instance in a HLR register. In such a case it would be necessary to ensure that the HLR information needed to monitor the processes which cause changes in location information is transmitted to the HLR.

Also the Periodic Location Update PLU, which is in use for instance in the GSM system, can be used according to the present invention be used for detecting a fraudulent mobile station. In the GSM system the mobile stations are programmed to transmit a location update request at regular intervals. The interval between the periodic location updates is in the range of 6 minutes to slightly more than 24 hours. The interval is selected by the operator of the system, and the mobile stations are informed of the selected interval by a value broadcasted by the base stations. The LOCATION UPDATE REQUEST message used for location updates in the GSM system includes a type information element. The type information element indicates a periodic updating, if the reason for the location update is a PLU. Thus it is possible to identify a PLU by analyzing the type information element.

A PLU should not normally trigger a change of LAC in a VLR. If a mobile station moves, it should transmit a location update request upon arrival in a new location area. Thus a change of LAC triggered by a PLU can be used, according to the present invention, to detect the presence of a fraudulent mobile station.

FIG. 3 illustrates a situation where the fraudulent mobile station MS' and the original mobile station MS are located in the coverage area of two different mobile switching centers MSC1 and MSC2.

In the following it is assumed that the original mobile station MS has already performed a location update to the location area LAC1 where it is shown in FIG. 3. Thus the VLR1 contains the subscriber data of the MS, which includes a location area code LAC1, and the home location register HLR1 of the mobile station MS includes information that the mobile station is located in the coverage area of the VLR1. At this moment the power of the fraudulent mobile station MS' is turned on. The fraudulent mobile station transmits therefore an IMSI attach message, which leads to a location update where the subscribe data of the MS is retrieved from the HLR1 and stored in the VLR2. The location area code LAC5 is also stored in VLR2. The data in the HLR1 is updated to indicate that the mobile station MS is located in the coverage area of VLR2 (which actually is not correct). In such a situation the HLR1 will transmit a message to the VLR1 to indicate that the mobile station is no longer within the coverage area of the VLR1. The message triggers the VLR1 to delete the subscriber data of the MS from its database.

If the mobile station MS initiates a MOC, MOSMS, MOUSSD, MOSS or PLU in the situation described above, then the VLR1 detects that the data of the mobile station MS is not included in its database, the data then being retrieved from the HLR1. The monitoring means 1 of the VLR1 will detect a change of LAC in the VLR1 (as a location area code of a new mobile station is stored into the database of the VLR1). The detection means 2 analyzes the reason for the change of LAC and discovers that the reason is a MOC, MOSMS, MOUSSD, MOSS or PLU, in other words, a process that should not trigger a change of LAC. Therefore a predetermined message indicating the detection of a fraudulent mobile station is transmitted to the Network Management System NMS1. The operator thus receives information that a fraudulent mobile station has been detected. The operator can then perform necessary actions, such as blocking the use of any mobile station with the identity (IMSI) of the mobile station MS.

It is to be understood that the above description and the accompanying Figures are only intended to illustrate the present invention. It is therefore possible to utilize the present invention also in other mobile communication systems than the GSM system used as an example. It will be obvious to those skilled in the art that the invention can be varied and modified also in other ways without departing from the scope and spirit of the invention disclosed in the attached claims.

The invention claimed is:

1. A method, comprising:
   detecting a change of a location area code for a mobile station operating in a mobile communication system, where location area codes for a plurality of mobile stations operating in a plurality of location areas are stored in a register of the mobile communication system that also stores subscriber data pertaining to the plurality of mobile stations;
   determining if the change in the location area code is a result of an occurrence of an event that is not expected to trigger a change in a location area code because the event is of such a nature that a valid event of that nature will have been preceded by a location area code change, and thus no location area code change would be expected to accompany the event, wherein the determining comprises examining an event type identifier to determine if the event type identifier indicates that the event is of a type that is not expected to trigger a change in a location area code; and
   if the event type identifier indicates that the event is not expected to trigger a change in a location area code, generating a message and transmitting the message to inform an operator of the mobile communication system that the mobile station has the same mobile station identity as another mobile station.

2. The method of claim 1, where the steps of detecting, determining, generating and transmitting the message are executed at a visitor location register.

3. The method of claim 1, where determining that the change in the location area code is a result of the occurrence of an event that is not expected to trigger a change in the location area code comprises determining that the event is a mobile station originated call.

4. The method of claim 1, where determining that the change in the location area code is a result of the occurrence of an event that is not expected to trigger a change in the location area code comprises determining that the event is a mobile station originated short message.

5. The method of claim 1, where determining that the change in the location area code is a result of the occurrence of an event that is not expected to trigger a change in the location area code comprises determining that the event is a mobile station originated unstructured supplementary service data.

6. The method of claim 1, where determining that the change in the location area code is a result of the occurrence of an event that is not expected to trigger a change in the location area code comprises determining that the event is a mobile station originated supplementary service.

7. The method of claim 1, where determining that the change in the location area code is a result of the occurrence of an event that is not expected to trigger a change in the location area code comprises determining that the event is a periodic location update.

8. The method of claim 1, where the method is performed as a result of execution of at least one computer program by a computer at a visitor location register.

9. An apparatus, comprising:
   at least one processor;
   memory storing a program of instructions;
   wherein the memory storing the program of instructions is configured to, with the at least one processor, cause the apparatus to perform, actions comprising at least:
   detecting a change of a location area code for a mobile station operating in a mobile communication system, wherein the apparatus has access to stored data relating to location area codes for a plurality of mobile stations operating in a plurality of location areas, and wherein the apparatus further has access to stored subscriber data pertaining to the plurality of mobile stations;
   determining if the change in the location area code is a result of an occurrence of an event that is not expected to trigger a change in a location area code because the event is of such a nature that no location area code change would be expected to accompany the event, wherein the determination comprises examining type identifier to determine if the event type identifier indicates that the event is of a type that is not expected to trigger a change in a location area code and, if the event type identifier indicates that the event is not expected to trigger a change in a location area code, generating a message and transmitting the message to inform an operator of the mobile communication system that the mobile station has the same mobile station identity as another mobile station.

10. The apparatus as in claim 9, where the apparatus is embodied as a visitor location register.

11. The apparatus as in claim 9, wherein determining that the change in the location area code is a result of the occurrence of an event that is not expected to trigger a change in the location area code comprises determining that the event is a mobile station originated call.

12. The apparatus as in claim 9, wherein determining that the change in the location area code is a result of the occurrence of an event that is not expected to trigger a change in the location area code comprises determining that the event is a mobile station originated short message.

13. The apparatus as in claim 9, wherein determining that the change in the location area code is a result of the occurrence of an event that is not expected to trigger a change in the location area code occurs when the event is a mobile station originated unstructured supplementary service data.

14. The apparatus as in claim 9, wherein determining that the change in the location area code is a result of the occurrence of an event that is not expected to trigger a change in the location area code comprises determining that the event is a mobile station originated supplementary service.

15. The apparatus as in claim 9, wherein determining that the change in the location area code is a result of the occurrence of an event that is not expected to trigger a change in the location area code comprises determining that the event is a periodic location update.

16. A method comprising:
in response to mobile station initiated event when it is located in one of a plurality of location areas associated with a first register of a mobile communication system, where each of the plurality of location areas has an associated location area code, at the first register of the mobile communication system determining that subscriber data for the mobile station is not stored in the first register;
retrieving the subscriber data of the mobile station from a second register of the mobile communication system;
detecting a change in a location area code for the mobile station in the first register from a location area code in the retrieved subscriber data when the location area code for the mobile station in the first register differs from a location area code in the retrieved subscriber data;
determining if the change in the location area code is a result of an occurrence of an event that is one of a set of events that is not expected to trigger a change in a location area code because no location area code change would be expected to accompany the event, wherein the determining comprises examining an event type identifier to determine if the event type identifier indicates that the event is of a type that is not expected to trigger a change in a location area code, and thus no location area code change would be expected to accompany the event; and
if the event type identifier indicates that the event is not expected to trigger a change in a location area code, generating a message and transmitting the message to inform an operator of the mobile communication system that the mobile station has the same mobile station identity as another mobile station.

\* \* \* \* \*